US011813953B2

(12) United States Patent
Ahtikari (10) Patent No.: US 11,813,953 B2
(45) Date of Patent: Nov. 14, 2023

(54) IDENTIFICATION METHOD FOR ELECTRIC VEHICLE CHARGING STATIONS (71) Applicant: Liikennevirta Oy / Virta Ltd, Helsinki (FI)

(72) Inventor: Jussi Ahtikari, Helsinki (FI)

(73) Assignee: LIIKENNEVIRTA OY / VIRTA LTD, Helsinki (FI)

( * ) Notice: Subject to any disclaimer, the term of this patent is extended or adjusted under 35 U.S.C. 154(b) by 0 days.

(21) Appl. No.: 18/005,949

(22) PCT Filed: Dec. 2, 2021

(86) PCT No.: PCT/FI2021/050840
§ 371 (c)(1),
(2) Date: Jan. 18, 2023

(87) PCT Pub. No.: WO2022/117924
PCT Pub. Date: Jun. 9, 2022

(65) Prior Publication Data
US 2023/0211693 A1   Jul. 6, 2023

(30) Foreign Application Priority Data

Dec. 4, 2020   (FI) .................................... 20206256

(51) Int. Cl.
*B60L 53/65* (2019.01)
*B60L 53/66* (2019.01)
*H02J 7/00* (2006.01)
*H04W 12/71* (2021.01)
*H04W 12/069* (2021.01)

(52) U.S. Cl.
CPC ............. *B60L 53/65* (2019.02); *B60L 53/66* (2019.02); *H02J 7/00045* (2020.01); *H04W 12/069* (2021.01); *H04W 12/71* (2021.01)

(58) Field of Classification Search
CPC ...... B60L 53/65; B60L 53/66; H02J 7/00045; H04W 12/069; H04W 12/71
See application file for complete search history.

(56) References Cited

U.S. PATENT DOCUMENTS

2009/0278492 A1\* 11/2009 Shimizu ................ H02J 7/0048
320/108
2010/0271172 A1\* 10/2010 Takikita .................... H04L 9/32
340/5.8

(Continued)

FOREIGN PATENT DOCUMENTS

CN    109716724 A    5/2019
CN    111799867 A    10/2020

(Continued)

OTHER PUBLICATIONS

Rabieh et al., "Efficient and Privacy-aware Authentication Scheme for EVs Pre-Paid Wireless Charging Services", May 2017, IEEE International Conference on Communications, pp. 1-6 (Year: 2017).\*

(Continued)

*Primary Examiner* — Kenneth W Chang
(74) *Attorney, Agent, or Firm* — McCoy Russell LLP (57) ABSTRACT

Various example embodiments relate to identifying an electric vehicle charging station. An authentication method applicable with any electric vehicle charging station may be provided. In an embodiment, an alert or quarantine of an electric vehicle charging may be triggered based on invalid authentication. Advantageously, improved security may be provided for communication in a charging management system. A computing device, a method and a computer program are disclosed.

12 Claims, 4 Drawing Sheets

(56) References Cited

U.S. PATENT DOCUMENTS

| | | | |
|---|---|---|---|
| 2010/0315197 A1 | 12/2010 | Solomon et al. | |
| 2011/0099111 A1* | 4/2011 | Levy | G06Q 50/06 705/14.1 |
| 2013/0110296 A1* | 5/2013 | Khoo | G06Q 10/1093 700/286 |
| 2013/0160086 A1* | 6/2013 | Katar | H04L 63/08 726/4 |
| 2018/0118045 A1* | 5/2018 | Gruzen | B60L 53/665 |
| 2019/0289004 A1 | 9/2019 | Kurian | |
| 2019/0289463 A1 | 9/2019 | Glouche et al. | |
| 2020/0307401 A1 | 10/2020 | Mondello et al. | |

FOREIGN PATENT DOCUMENTS

| | | |
|---|---|---|
| JP | 2013125334 A | 6/2013 |
| JP | 2019149707 A | 9/2019 |
| WO | 2020197741 A1 | 10/2020 |

OTHER PUBLICATIONS

"Challenge-Handshake Authentication Protocol," Wikipedia Website, Available Online at https://en.wikipedia.org/wiki/Challenge-Handshake_Authentication_Protocol, Page Created Aug. 14, 2022, 2 pages.

Hassija, V. et al., "A Survey on IoT Security: Application Areas, Security Threats, and Solution Architectures," IEEE Access, vol. 7, Jun. 20, 2019, 23 pages.

"Improved security for OCPP 1.6-J," Edition 2, Open Charge Alliance Website, Availabel Online at https://www.openchargealliance.org/protocols/ocpp-16/, Mar. 31, 2020, 67 pages.

Finnish Patent and Registration Office, Search Report Issued in U.S. Appl. No. 20/206,256, dated Mar. 5, 2021, 2 pages.

ISA European Patent Office, International Search Report Issued in Application No. PCT/FI2021/050840, dated Feb. 28, 2022, WIPO, 3 pages.

* cited by examiner

IDENTIFICATION METHOD FOR ELECTRIC VEHICLE CHARGING STATIONS

CROSS REFERENCE TO RELATED APPLICATIONS

The present application is a U.S. National Phase of International Application No. PCT/FI2021/050840 entitled "AN IDENTIFICATION METHOD FOR ELECTRIC VEHICLE CHARGING STATIONS," and filed on Dec. 2, 2021. International Application No. PCT/FI2021/050840 claims priority to Finnish Patent Application No. 20206256 filed on Dec. 4, 2020. The entire contents of each of the above-listed applications are hereby incorporated by reference for all purposes.

TECHNICAL FIELD

Various example embodiments generally relate to the field of electric vehicle charging stations. In particular, some example embodiments relate to a secure method for identification of the electric vehicle charging stations.

BACKGROUND

Electric vehicle charging stations are used to charge electric vehicles (EV), such as electric cars. The EV charging stations may be connected to a central management device, such as to a charging point management system (CPMS) with open charge point protocol (OCPP). When an EV charging station connects to the CPMS, the EV charging station may send an individual identity of the EV charging station in the connection message, along with the vendor and model of the EV charging station. However, the information provided by the EV charging station may be easily obtained by anybody which makes the identification insecure.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

An objective of the disclosure is identifying an electric vehicle charging station in a reliable manner. At least one identifier may be generated for the electric vehicle charging station, wherein the information used for the identifier may not be publicly available. The identifier may be compared to a stored reference identifier to determine if the generated identifier is valid. Based on the comparison, normal operation of the electric vehicle charging station may be allowed or one or more security operations may be initiated. The objective is achieved by the features of the independent claims. Some embodiments are described in the dependent claims.

According to a first aspect, a method is provided. The method may comprise obtaining information associated to a model of an electric vehicle charging station in response to an established connection with the electric vehicle charging station; sending a message to the electric vehicle charging station to obtain configuration data of the electric vehicle charging station; generating a first identifier of the electric vehicle charging station based on the information associated with the model and the configuration data; and authenticating the electric vehicle charging station based on the first identifier.

According to an embodiment, the information associated to the model of the electric vehicle charging station may comprise a vendor, a model and a firmware version of the electric vehicle charging station.

According to an embodiment, in addition or alternatively, the configuration data may comprise one or more configuration keys.

According to an embodiment, in addition or alternatively, the method may further comprise comparing the first identifier to a stored first reference identifier, wherein the first reference identifier is based on information associated to the same model as the electric vehicle charging station; and determining the authentication is successful if the first identifier and the first reference identifier match.

According to an embodiment, in addition or alternatively, the method may further comprise isolating data associated with the electric vehicle charging station when the authentication is unsuccessful, wherein the data is excluded from other data and operations.

According to an embodiment, in addition or alternatively, the method may comprise releasing the data from isolation in response to a verification from an administrator.

According to an embodiment, in addition or alternatively, the method may comprise updating the first reference identifier based on an updated firmware version of the electric vehicle charging station.

According to an embodiment, in addition or alternatively, the method may comprise obtaining an identity of the electric vehicle charging station; obtaining an identifier associated to a connection of the electric vehicle charging station; generating a second identifier of the electric vehicle charging station based on the first identifier, the identity of the electric vehicle charging station and the identifier associated with the connection; comparing the second identifier to a second reference identifier associated to the electric vehicle charging station; and wherein the electric vehicle charging station is successfully authenticated when the second identifier matches the second reference identifier.

According to an embodiment, in addition or alternatively, the second reference identifier may be based on a previous second identifier generated for the electric vehicle charging station, wherein a new second identifier is generated each time a new connection is established with the electric vehicle charging station.

According to an embodiment, in addition or alternatively, the method may comprise sending an alert in response to an unsuccessful authentication based on the second identifier.

According to an embodiment, in addition or alternatively, the identifier associated to the connection may comprise at least one of an integrated circuit card identifier of a card subscriber identity module or an internet protocol address of the electric vehicle charging station.

According to an embodiment, in addition or alternatively, at least one of the first or the second identifier may be generated by combining the obtained information for generating the first or second identifier to a string and creating a cryptographic hash based on the string.

According to a second aspect, a computing device is provided. The computing device may comprise at least one processor; and at least one memory including computer program code; the at least one memory and the computer program code configured to, with the at least one processor, cause the computing device at least to: obtain information associated to a model of an electric vehicle charging station in response to an established connection with the electric vehicle charging station; send a message to the electric vehicle charging station to obtain configuration data of the electric vehicle charging station; generate a first identifier of the electric vehicle charging station based on the information associated with the model and the configuration data; and authenticate the electric vehicle charging station based on the first identifier. The computing device may be further configured to implement any embodiment of the first aspect.

According to a third aspect, a computer program product is provided comprising instructions which, when the program is executed by a computer, cause the computer to carry out the method of the second aspect.

According to a fourth aspect, a computer-readable medium is provided comprising instructions which, when executed by a computer, cause the computer to carry out the method of the second aspect.

Many of the attendant features will be more readily appreciated as they become better understood by reference to the following detailed description considered in connection with the accompanying drawings.

BRIEF DESCRIPTION OF THE DRAWINGS

The accompanying drawings, which are included to provide a further understanding of the example embodiments and constitute a part of this specification, illustrate example embodiments and together with the description help to explain the example embodiments. In the drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of operations for constructing and operating the example. However, the same or equivalent functions and sequences may be accomplished by different examples.

The OCPP may have by design some security flaws. One of the security issues is that when the CPMS gets a message from an EV charging station, the CPMS may have no means to determine if the EV charging station is who it really claims to be. Anybody may be able to send a message to the CPMS claiming to be an EV charging station with a certain identity. The CPMS may have no means for knowing if the message really comes from the EV charging station associated with the identity or not. Newer OCPP versions may provide authentication on the protocol level, but the authentication methods are optional, and most EV charging stations may not support them. There may be tens of thousands of EV charging stations that do not provide technically any kind of authentication on the OCPP protocol level. Hence, the security issues may not be solved using the OCPP protocol's authentication features.

An objective of this disclosure is to provide a method for verifying if messages are really coming from a certain charging station. The method may be used for authentication of any EV charging station. Old EV charging stations which may not support authentication provided by OCPP may be also securely identified.

According to an example embodiment, "technical fingerprints" may be generated for EV charging stations to identify if an EV charging station is who it claims to be. The technical fingerprints may be created as identifiers based on individual, but not publicly known properties of different EV charging stations and EV charging station models. At least one of two types of identifiers may be used. A first identifier may be based on a model of the EV charging station. A second identifier may be based on individual properties of the EV charging station.

The first identifier may be based on the fact that each EV charging station model may have an individual set of configuration keys which may be accessible, for example, through a request. The configuration keys may not be public knowledge. Further, the configuration keys may be a lot more difficult to fake than just vendor and model information. The first identifier may be further based on the EV charging station's technical firmware version name, which also may not be public information. In an embodiment, the first identifier of an EV charging station may be created, for example, based on a vendor, a model, one or more configuration keys and/or the firmware version of the EV charging station. The first identifier of the EV charging station may be compared to first identifiers of other EV charging stations of the same model to determine if a message is coming from a fake or a genuine EV charging station. A first reference identifier may be stored for authenticating EV charging stations of the same model.

Figure 1:
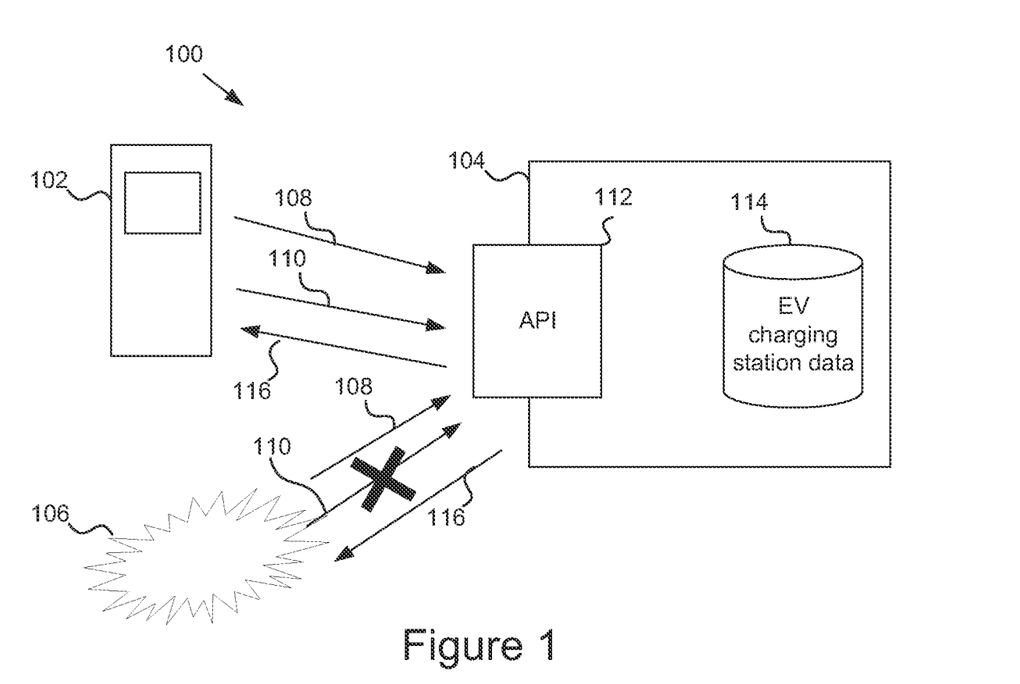
FIG. 1 illustrates an example of a charging management system according to an example embodiment.

FIG. 1 illustrates an example of a charging management system 100 according to an example embodiment. The charging management system 100 may comprise at least one EV charging station 102 and a computing device 104. The computing device 104 may be a single device, such as a server, or comprise a plurality of devices which may be distributed. The EV charging stations 102 and the computing device 104 may be configured to be communicatively coupled, for example, using a data connection. The connection between the EV charging station and the computing device may be established, for example, based on an endpoint-address. The endpoint-address may be based on a web-socket or SOAP-service (simple object access protocol) provided by the computing device where the EV charging stations connect to. The computing device 104 may be configured for administrating and monitoring one or more electric vehicle charging stations 102. The computing device 104 may comprise a local memory 114 storing EV charging station data. The EV charging station data may comprise information associated with the EV charging stations 102, such as vendor, model, usage, identity, location, and billing information associated to specific EV charging stations. The computing device 104 may comprise an application programming interface (API) 112 for communication between the EV charging stations 102 and other devices, and the computing device 104.

When the EV charging station 102 initiates a connection with the computing device 104, it may send a request 108 comprising information associated with the specific EV charging station 102, such as a vendor, a model and an identity of the EV charging station 102. The computing device 104 may accept or reject the request 108. After accepted request, the EV charging station 102 may continue communication with the computing device 104. The communication may comprise, for example, charging transactions, i.e. allow an electric vehicle to start charging at the EV charging station and/or charge a user for the charging event.

However, if somebody knows the identity, model and vendor of an EV charging station, one may easily send a lot of invalid data to the computing device, claiming to be a real EV charging station 102. For example, one may simply launch an attack where the attacker creates a new fake identity for an EV charging station, takes one of well-known model names from the market, and starts sending fake messages to the computing device 104. For example, a false EV charging station 106 may send identical request 108 comprising the same information as in the request 108 of the real EV charging station 102. If the computing device accepts the fake EV charging station 106 based on the false information, the fake EV charging station 106 may continue sending fake messages which may, for example, have fake information about an electric vehicle charging on an EV charging station and generate fake monetary transactions.

In an embodiment, the computing device 104 may be configured to send a request 116 to the EV charging stations 102, 106 for configuration keys, for example, in response to the request 108. The configuration keys may be associated to functionalities provided by the EV charging station and configured by the key. The computing device 104 may be able to read and/or change the configuration keys and associated values. The computing device 104 may be configured to calculate a first identifier associated with the EV charging station 102 based on the configuration keys received from the EV charging station 102. The first identifier may be compared to a first reference identifier. The first reference identifier may be stored in the local memory 114. Based on the comparison, normal operation of the EV charging station 102 may be allowed. Normal communication between the computing device 104 and the EV charging station 102 may continue to enable, for example, charging transactions 110 and data exchange.

Based on the request 116 from the computing device 104, the fake EV charging station 106 may either fail to respond or fail to provide valid configuration keys for the authentication. In response to an unsuccessful authentication, the fake EV charging station 106, or any EV charging station without a valid first identifier, may be rejected by the computing device 104. The rejected EV charging station may not be able to continue communication with the computing device 104 until it may be successfully identified.

Figure 2:
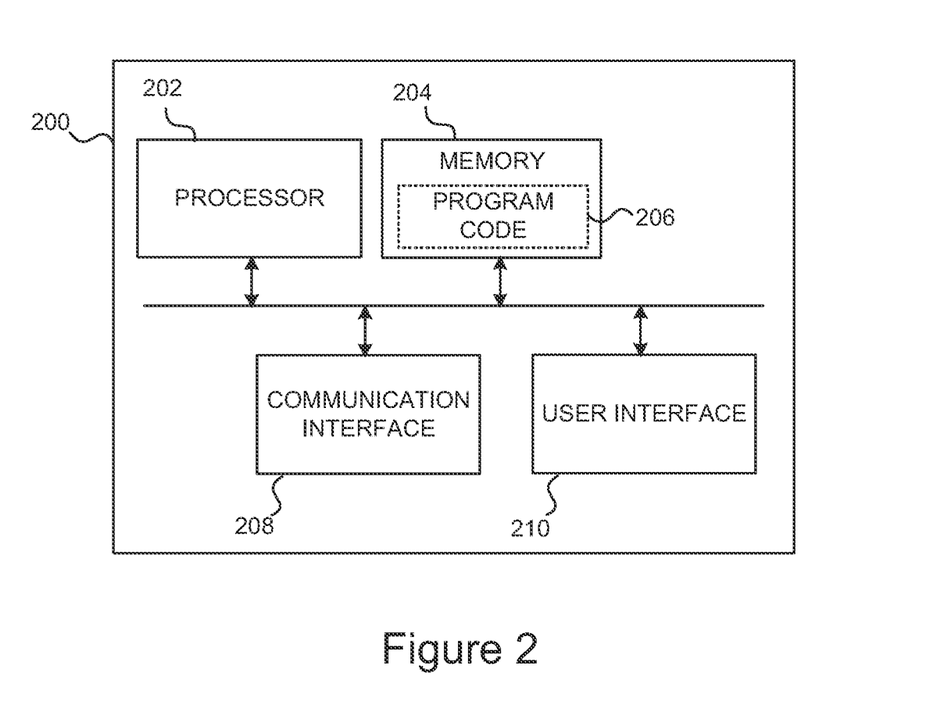
FIG. 2 illustrates an example of a computing device configured to practice one or more example embodiments, according to an example embodiment.

FIG. 2 illustrates an example embodiment of the computing device 104 configured to practice one or more example embodiments. The computing device 104 may comprise at least one processor 202. The at least one processor may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The computing device 104 may further comprise at least one memory 204. The memory may be configured to store, for example, computer program code or the like, for example operating system software and application software. In an embodiment, the memory 204 may comprise the EV charging station data. The memory 204 may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The computing device 104 may further comprise communication interface 208 configured to enable computing device 104 to transmit and/or receive information, to/from other devices. The communication interface 208 may be configured to provide at least one wireless radio connection, such as for example a 3GPP mobile broadband connection (e.g. 3G, 4G, 5G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. Communication interface 208 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

The computing device 104 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the computing device 104 is configured to implement some functionality, some component and/or components of the computing device 104, such as for example the at least one processor 202 and/or the memory 204, may be configured to implement this functionality. Furthermore, when the at least one processor 202 is configured to implement some functionality, this functionality may be implemented using program code 206 comprised, for example, in the memory 204.

The functionality described herein may be performed, at least in part, by one or more computer program product components such as software components. According to an embodiment, the computing device 104 comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The computing device 104 comprises means for performing at least one method described herein. In one example, the means comprises the at least one processor 202, the at least one memory 204 including program code 206 configured to, when executed by the at least one processor 202, cause the computing device 200 to perform the method.

The computing device 104 may comprise for example a server device, a client device, a mobile phone, a tablet computer, a laptop, or the like. Although the computing device 104 is illustrated as a single device it is appreciated that, wherever applicable, functions of the computing device 104 may be distributed to a plurality of devices.

Figure 3:
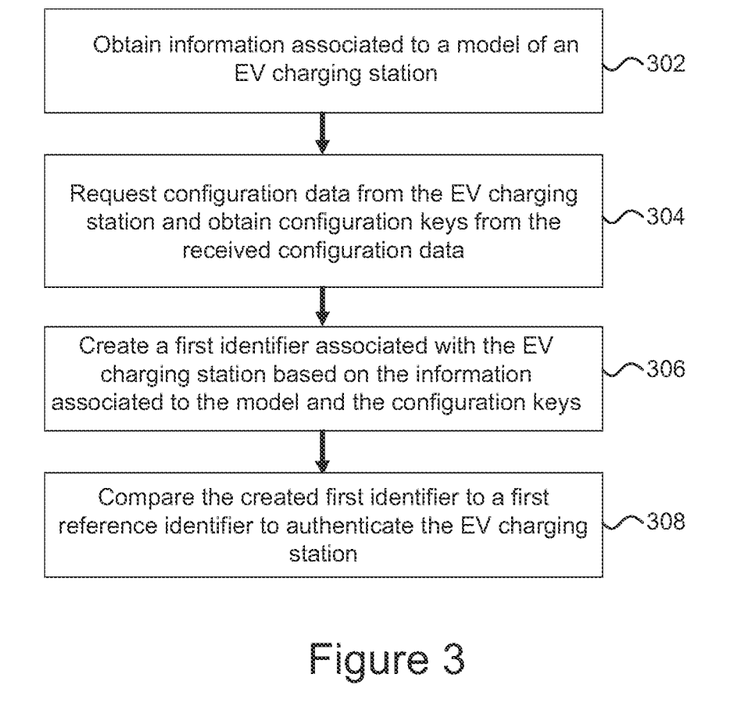
FIG. 3 illustrates an example of a method for identifying an electric vehicle charging station based on a first identifier, according to an example embodiment.

FIG. 3 illustrates an example of a method for identifying an EV charging station based on a first identifier, according to an example embodiment. The method may be executed, for example, by the computing device 104.

At 302, the method may comprise obtaining information associated to a model of the EV charging station. The information may comprise, for example, a vendor, the model and a firmware version of the EV charging station. In an embodiment, the EV charging station may send a request to the computing device 104 with information about configuration of the EV charging station. The request may comprise the vendor, the model, and/or the firmware version of the EV charging station. The computing device 104 may be configured to read the information from the request.

The computing device 104 may be configured to respond to indicate whether it accepts the EV charging station. The EV charging station may be configured to send the request each time it starts or restarts a connection with the computing device 104. If the EV charging station has previously established a connection with the computing device, the information associated with the model may be obtained from a memory of the computing device 104. Before a successful completion of the request after each connection, the EV charging station may not send any other request to the computing device 104. The request may be also rejected by the computing device 104. In response to the reject, the computing device 104 may, for example, close the communication channel. Initiation of any transactions may be allowed only in response to the status of the EV charging station being accepted.

At 304, the method may comprise requesting configuration data from the EV charging station. The method may further comprise obtaining configuration keys from the received configuration data.

At 306, the method may comprise creating the first identifier associated with the EV charging station. The first identifier may be based on the information associated with the model of the EV charging station and one or more of the configuration keys. The result may be an individual identifier for a certain vendor, model and a firmware version of the EV charging station.

In an embodiment, the computing device 104 may be configured to combine all the information gathered at 302 and 304 to a single string (e.g. vendor+model+firmware version+configuration keys). Based on the combined information, the computing device 104 may be configured to create a cryptographic hash from the string. For example, MD5 may be used as a hash function, but also other hash algorithms like SHA-2 or CRC can be used for hashing.

At 308, the method may comprise comparing the created first identifier to a first reference identifier to authenticate the EV charging station.

In an embodiment, an EV charging station may have been connected to the computing device 104. The computing device 104 may have stored information associated to the EV charging station to a local data storage upon the connection. The EV charging station may lose the connection and open a new connection but may not send a new request. The computing device 104 may send the configuration key request to the EV charging station and read the other information (the vendor, the model, and/or the firmware) from the local data storage of the computing device 104.

The first identifier may be the same for all EV charging stations with the same vendor, model and firmware version. The first identifier may be secure as at least the configuration keys may not be publicly known. Further, additional safety measures may be used such as creating the first identifier based on a cryptographic hash.

New EV charging station models may be added to the local storage of the computing device 104, for example, through human supervised testing. In an embodiment, when a new EV charging station model is added to the computing device for the first time, also a first identifier may be saved as the first reference identifier to the EV charging station model information.

Firmware versions of the EV charging stations may change. For example, when a firmware update is initiated for an EV charging station, after the update is finished, the previous first identifier may not be valid because it no longer matches the first reference identifier. The firmware update may be initiated, for example, through the computing device 104. In an embodiment, the computing device 104 may be configured to calculate a new first reference identifier based on the new firmware version. The stored first reference identifier may be updated based on the new first reference identifier.

Figure 4:
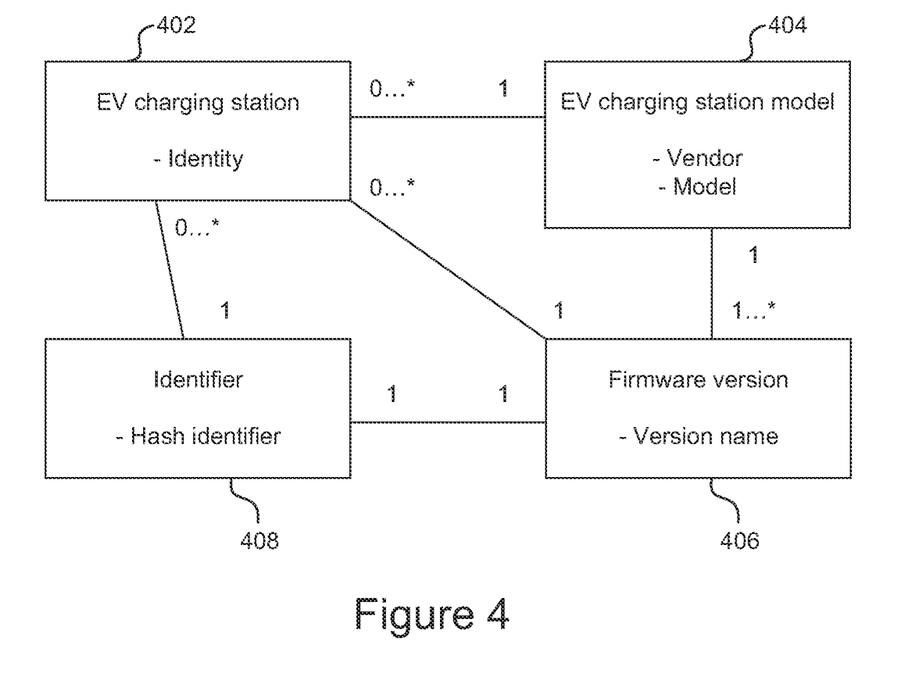
FIG. 4 illustrates an example of a data model of a method for identification of electric vehicle charging stations, according to an example embodiment.

FIG. 4 illustrates a data model of a method for identification of EV charging stations, according to an example embodiment. The data model illustrates elements of data which may be used in the method and how the data elements relate to each other and entities.

The data model comprises information on zero or more EV charging stations 402. Each EV charging station 402 may have an identity. The data model may further comprise one or more EV charging station models. An EV charging station 402 may be associated with one EV charging station model 404, and different EV charging stations 402 may be associated with different EV charging station models 404. The EV charging station model 404 may comprise information on a vendor and the model of the EV charging station 402. Each EV charging station model may be associated with one or more firmware versions 406, wherein each firmware version may comprise a different version name. A single EV charging station 402 may be associated with one firmware version 406 at the time, and one firmware version 406 may be associated with zero or more EV charging stations 402. One identifier 408, which may be a hash identifier, may be associated with one firmware version 406. Further, one identifier 408 may be associated with zero or more EV charging stations 402. The identifier may be a first or a second identifier configured to identify at least one EV charging station 402.

Figure 5:
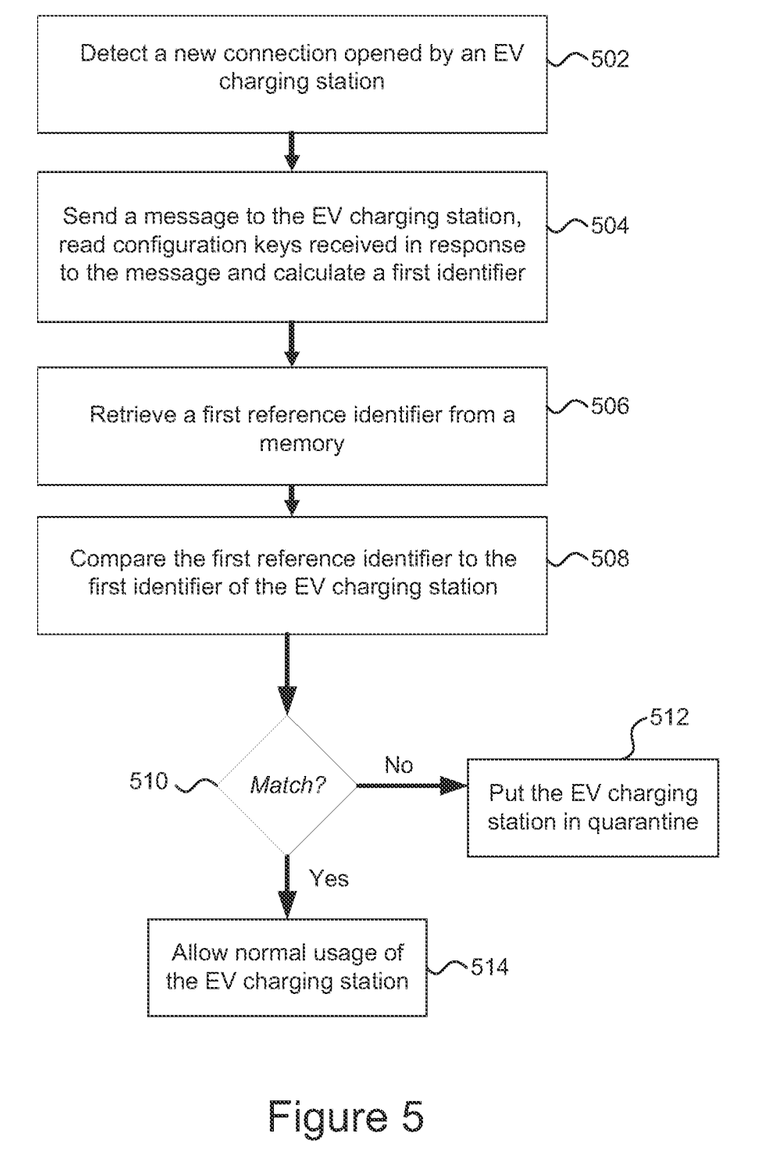
FIG. 5 illustrates an example of a security procedure based on a first identifier of an electric vehicle charging station, according to an example embodiment.

FIG. 5 illustrates an example of a security procedure based on a first identifier of an electric vehicle charging station, according to an example embodiment. The procedure may be executed, for example, by the computing device 104.

At 502, the method may comprise detecting a new connection opened by the electric vehicle charging station for communication with the computing device 104. The connection may be any connection configured for transmitting and/or receiving data. The connection may comprise, for example, a websocket connection.

At 504, the method may comprise sending a message to the EV charging station for obtaining configuration keys associated with the EV charging station. The method may further comprise reading, by the computing device 104, the configuration keys from a response received from the EV charging station. The method may further comprise calculating the first identifier associated with the specific EV charging station based on the configuration keys. The calculation may be performed as described earlier in connection with FIG. 3.

At 506, the method may comprise retrieving a first reference identifier from a memory. The first reference identifier may be selected based on the model information of the EV charging station. The first reference identifiers may be stored in a memory of the computing device 104. Alternatively, the first reference identifiers may be stored in a remote memory accessible by the computing device 104. The memory may comprise a plurality of first reference identifiers, wherein each first reference identifier is associated to a different EV charging station model.

At 508, the method may comprise comparing the first reference identifier to the first identifier of the EV charging station.

At 510, the method may comprise determining if the first identifier of the EV charging station matches the first reference identifier. If the identifiers match, the computing device may allow normal usage of the EV charging station at 514. If the identifiers fail to match, at 512, the EV charging station may be put in quarantine. In an embodiment, the computing device 104 may determine that usage of the specific EV charging station is not allowed for a predetermined time in response to the failed authentication. In an embodiment, the computing device 104 may alert an administrator to investigate why the first identifier is incorrect.

When an EV charging station is put in quarantine, data associated to the EV charging station may be saved to the computing device 104, but the data may be isolated and excluded from normal functionality of the computing device 104. For example, the data may not be shown on normal reports, the data may not be included in billing and/or the data may be excluded from APIs and data exports.

The isolated data may be accessed in the computing device 104 by administrator users who may be able to verify the data and/or modify the data. The data may be modified, for example, if something needs to be corrected. Further, the administrator users may be allowed to release the isolated data to normal data once they have ensured that the data is correct.

In an embodiment, a second identifier may be generated for identification of single EV charging stations. Hence, each individual EV charging station may have its own identifier in addition or alternatively to the charging station model-based first identifiers which may be the same for all the EV charging stations of the same EV charging station vendor and model.

Figure 6:
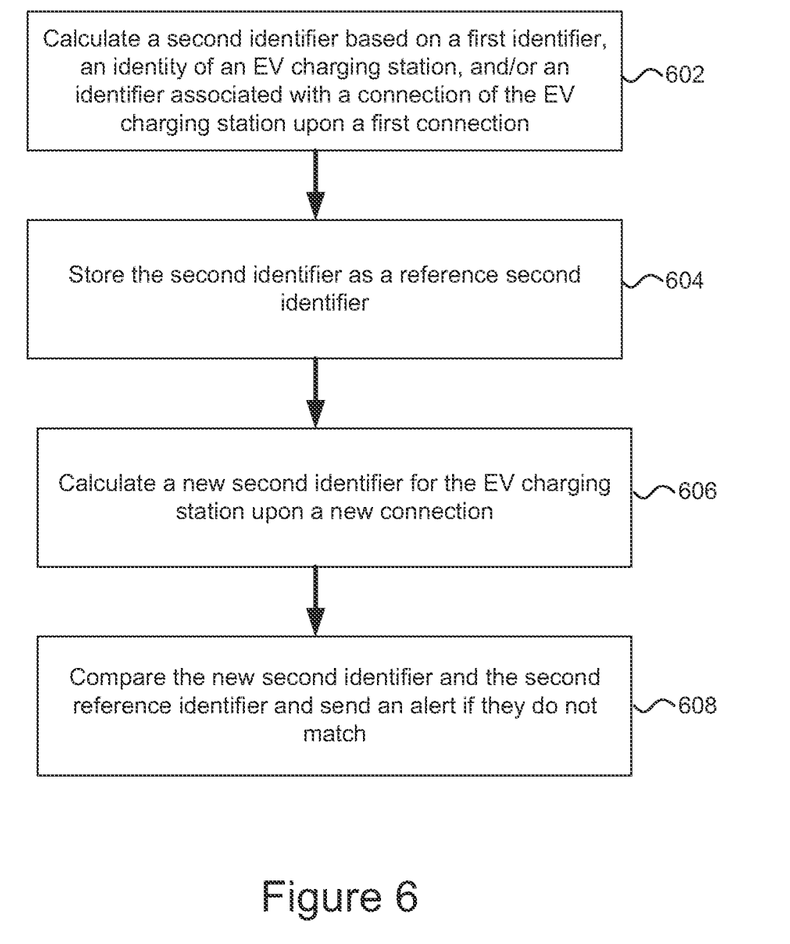
FIG. 6 illustrates an example of a method for identifying an electric vehicle charging station based on a second identifier and an associated security procedure, according to an example embodiment.

FIG. 6 illustrates an example of a method for identifying an electric vehicle charging station based on a second identifier and an associated security procedure, according to an example embodiment. The method may be executed, for example, by the computing device.

At 602, the method may comprise calculating the second identifier based on the first identifier, an identity of the EV charging station and/or an identifier associated to a connection between the EV charging station and the computing device.

In an embodiment, the identifier associated with the connection may comprise any unique identifier, such as a string associated to identifying the EV charging station when initiating a connection. In an embodiment, the identifier associated with the connection comprises an ICCID (integrated circuit card identifier) of a SIM-card (SIM, subscriber identity module) of the EV charging station. In an embodiment, the identifier associated with connection may comprise an internet protocol (IP)-address of the EV charging station. The identifier may depend on a connection type of the EV charging station, for example, whether the EV charging station is connected through a fixed network or a mobile network.

The identity of the EV charging station may be obtained, for example, from a request received from the EV charging station upon establishing a connection with the computing device. The identity may be comprised in the same message with a vendor, a model, and a firmware version of the EV charging station used for calculating the first fingerprint.

In an embodiment, the second identifier associated with the EV charging station may be generated by combining all the information (the first identifier, the identity of the EV charging station and/or the identifier associated to the connection) to a single string and calculating a hash from the string.

The computing device may generate the second identifier for the EV charging station when the EV charging station is connected to the computing device for the first time. At 604, the second identifier may be stored as a second reference identifier for the EV charging station. The second reference identifier may be stored, for example, to a local memory storage of the computing device 104. If the EV charging station at some point loses the connection and opens a new connection, the computing device 104 may calculate a new second identifier for the EV charging station at 606. At 608, the new second identifier may be compared to the previous second identifier calculated for the EV charging station.

In an embodiment, the computing device 104 may be configured to generate an alert to an administrator if the new second identifier and the second reference identifier do not match. In an embodiment, the alert may be sent, for example, through email, SMS or mobile app's push notification. In case of an invalid second identifier, the alert may be sent but the EV charging station may not be put to quarantine. There may be some valid, though uncommon cases when the second identifier of an EV charging station can change. For example, the second identifier may have changed when the SIM-card of the EV charging station is replaced by a new SIM-card. Hence the ICCID and, consequently, the second identifier may have changed. The second identifier may be used as an additional security feature, which may trigger alert on possible incorrect data detected from a connected EV charging station.

Further features of the method(s) directly result for example from functionalities of the computing devices described throughout the specification and in the appended claims and are therefore not repeated here. Different variations of the method(s) may be also applied, as described in connection with the various example embodiments. It is obvious to a person skilled in the art that with the advancement of technology, the basic idea of the disclosure may be implemented in various ways. The disclosure and the embodiments are thus not limited to the examples described above, instead they may vary within the scope of the claims.

A computing device may be configured to perform or cause performance of any aspect of the method(s) described herein. Further, a computer program may comprise instructions for causing, when executed, a computing device to perform any aspect of the method(s) described herein. Further, a computing device may comprise means for performing any aspect of the method(s) described herein. According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or device may contain additional blocks or elements.

The terms "automated", "automatically", "automatic" and variations thereof, as used herein, may refer to any process or operation done without human input when the process or operation is performed. However, a process or operation can be automatic, even though performance of the process or operation uses human input, if the input is received before performance of the process or operation.

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A method, the method comprising:
    obtaining information associated to a model of an electric vehicle charging station in response to an established connection with the electric vehicle charging station;
    sending a message to the electric vehicle charging station to obtain an individual set of one or more configuration keys of the electric vehicle charging station model, wherein the one or more configuration keys are configured to be accessible through a request so that the one or more configuration keys are not public knowledge;
    generating a first identifier of the electric vehicle charging station based on the information associated with the model and the one or more configuration keys;
    comparing the first identifier to a stored first reference identifier, wherein the first reference identifier is based on information associated to the same model as the electric vehicle charging station;
    determining an authentication is successful if the first identifier and the first reference identifier match; and
    authenticating the electric vehicle charging station based on the match.

2. The method of claim 1, wherein the information associated to the model of the electric vehicle charging station comprises a vendor, a model and a firmware version of the electric vehicle charging station.

3. The method of claim 1, wherein the method further comprises:
    isolating data associated with the electric vehicle charging station when the authentication is unsuccessful, wherein the data is excluded from other data and operations.

4. The method of claim 3, further comprising:
    releasing the data from isolation in response to a verification from an administrator.

5. The method of claim 2, wherein the method comprises:
    updating the first reference identifier based on an updated firmware version of the electric vehicle charging station.

6. The method of claim 1, further comprising:
    obtaining an identity of the electric vehicle charging station;
    obtaining an identifier associated to a connection of the electric vehicle charging station;
    generating a second identifier of the electric vehicle charging station based on the first identifier, the identity of the electric vehicle charging station and the identifier associated with the connection;
    comparing the second identifier to a second reference identifier associated to the electric vehicle charging station; and
    wherein the electric vehicle charging station is successfully authenticated when the second identifier matches the second reference identifier.

7. The method of claim 6, wherein the second reference identifier is based on a previous second identifier generated for the electric vehicle charging station, wherein a new second identifier is generated each time a new connection is established with the electric vehicle charging station.

8. The method of claim 6, further comprising:
    sending an alert in response to an unsuccessful authentication based on the second identifier.

9. The method of claim 6, wherein the identifier associated to the connection comprises at least one of an integrated circuit card identifier of a card subscriber identity module or an internet protocol address of the electric vehicle charging station.

10. The method of claim 6, wherein at least one of the first or the second identifier is generated by combining the obtained information for generating the first or second identifier to a string and creating a cryptographic hash based on the string.

11. A non-transitory computer-readable medium comprising instructions which, when executed by a computer, cause the computer to carry out the method of claim 1.

12. A computing device, the computing device comprising:
at least one processor; and
at least one memory including computer program code;
the at least one memory and the computer program code configured to, with the at least one processor, cause the computing device at least to:
obtain information associated to a model of an electric vehicle charging station in response to an established connection with the electric vehicle charging station;
send a message to the electric vehicle charging station to obtain an individual set of one or more configuration keys of the electric vehicle charging station model, wherein the one or more configuration keys are configured to be accessible through a request so that the one or more configuration keys are not public knowledge;
generate a first identifier of the electric vehicle charging station based on the information associated with the model and the one or more configuration keys;
compare the first identifier to a stored first reference identifier, wherein the first reference identifier is based on information associated to the same model as the electric vehicle charging station;
determine an authentication successful if the first identifier and the first reference identifier match; and
authenticate the electric vehicle charging station based on the match.

* * * * *